(12) United States Patent
Dela Cruz

(10) Patent No.: US 10,818,430 B2
(45) Date of Patent: Oct. 27, 2020

(54) TRANSMITTER FOR INDUCTIVE POWER TRANSFER SYSTEM

(71) Applicant: Apple Inc., Cupertino, CA (US)

(72) Inventor: Lawrence Bernardo Dela Cruz, Auckland (NZ)

(73) Assignee: Apple Inc., Cupertino, CA (US)

( * ) Notice: Subject to any disclaimer, the term of this patent is extended or adjusted under 35 U.S.C. 154(b) by 566 days.

(21) Appl. No.: 15/514,251

(22) PCT Filed: Sep. 22, 2015

(86) PCT No.: PCT/NZ2015/050160
§ 371 (c)(1),
(2) Date: Mar. 24, 2017

(87) PCT Pub. No.: WO2016/048170
PCT Pub. Date: Mar. 31, 2016

(65) Prior Publication Data
US 2017/0301462 A1    Oct. 19, 2017

Related U.S. Application Data

(60) Provisional application No. 62/055,924, filed on Sep. 26, 2014.

(51) Int. Cl.
*H01F 27/02* (2006.01)
*H01F 27/28* (2006.01)
*H01F 38/14* (2006.01)
*H02J 50/12* (2016.01)

(52) U.S. Cl.
CPC .............. *H01F 38/14* (2013.01); *H01F 27/02* (2013.01); *H01F 27/2823* (2013.01); *H02J 50/12* (2016.02)

(58) Field of Classification Search
CPC ...... H01F 27/02; H01F 27/2823; H01F 38/14; H02J 50/12
USPC ................ 307/104; 333/219; 320/108, 109; 363/22
See application file for complete search history.

(56) References Cited

U.S. PATENT DOCUMENTS

| 3,800,213 A | 3/1974 | Rorden |
| 4,825,166 A | 4/1989 | MacGugan |
| 5,281,941 A | 1/1994 | Bernstein |

(Continued)

FOREIGN PATENT DOCUMENTS

| CN | 1185867 A | 6/1998 |
| CN | 101630562 A | 1/2010 |

(Continued)

OTHER PUBLICATIONS

European Search Report for EP Application No. 15844230.1 dated Oct. 4, 2017 (11 pages).

(Continued)

*Primary Examiner* — Rexford N Barnie
*Assistant Examiner* — Toan T Vu
(74) *Attorney, Agent, or Firm* — Blank Rome LLP

(57) ABSTRACT

An inductive power transfer transmitter that includes an enclosure for accommodating devices to be energised. The enclosure has one or more side walls and one or more coils for generating an alternating magnetic field within the enclosure. The density of the one or more coils varies with distance from an end of the one or more sidewalls.

12 Claims, 15 Drawing Sheets

(56) References Cited

U.S. PATENT DOCUMENTS

| | | | |
|---|---|---|---|
| 7,248,017 B2 | 7/2007 | Cheng | |
| 7,414,380 B2 | 8/2008 | Tang | |
| 7,511,454 B1 | 3/2009 | Legg | |
| 7,795,841 B2 | 9/2010 | Matsumoto | |
| 8,338,990 B2 | 12/2012 | Baarman | |
| 8,487,480 B1 | 7/2013 | Kesler | |
| 8,587,154 B2 | 11/2013 | Fells | |
| 2008/0000522 A1 | 1/2008 | Johnson et al. | |
| 2008/0116847 A1 | 5/2008 | Loke et al. | |
| 2008/0129246 A1 | 6/2008 | Morita | |
| 2008/0246675 A1 | 10/2008 | Folcke et al. | |
| 2009/0010462 A1 | 1/2009 | Ekchian | |
| 2009/0201142 A1* | 8/2009 | Zou | G06K 19/0723 340/505 |
| 2009/0230777 A1 | 9/2009 | Baarman et al. | |
| 2009/0303693 A1 | 12/2009 | Mao | |
| 2010/0259108 A1 | 10/2010 | Giler et al. | |
| 2011/0086256 A1 | 4/2011 | Julstrom | |
| 2011/0115429 A1 | 5/2011 | Toivola | |
| 2011/0127954 A1 | 6/2011 | Walley | |
| 2012/0235636 A1 | 9/2012 | Partovi | |
| 2012/0248893 A1 | 10/2012 | Teggatz et al. | |
| 2013/0069445 A1 | 3/2013 | Waffenschmidt | |
| 2013/0119927 A1 | 5/2013 | Partovi | |
| 2014/0265621 A1* | 9/2014 | Wong | H02J 50/70 307/104 |
| 2015/0171658 A1* | 6/2015 | Manova-Elssibony | H04B 5/0006 320/108 |
| 2015/0222129 A1* | 8/2015 | McCauley | H01F 38/14 307/104 |

FOREIGN PATENT DOCUMENTS

| | | |
|---|---|---|
| CN | 101714767 A | 5/2010 |
| CN | 101971452 A | 2/2011 |
| CN | 103918047 A | 7/2014 |
| CN | 103918047 B | 7/2014 |
| CN | 103918047 B | 10/2017 |
| DE | 10218124 A1 | 11/2003 |
| EP | 2161811 A1 | 3/2010 |
| GB | 2388716 A | 11/2003 |
| JP | H04317527 A | 11/1992 |
| JP | 2001190029 A | 7/2001 |
| JP | 2005525705 A | 8/2005 |
| JP | 2009123943 A | 6/2009 |
| JP | 2011517926 A | 6/2011 |
| JP | 2012134248 A | 7/2012 |
| JP | 2014534623 A | 12/2014 |
| KR | 10-2008-0096919 A | 11/2008 |
| KR | 10-20080096919 A | 11/2008 |
| KR | 100937627 B1 | 1/2010 |
| WO | 0167046 A1 | 9/2001 |
| WO | 03096512 A2 | 11/2003 |
| WO | 2010127685 A1 | 11/2010 |
| WO | 2013/051947 A1 | 4/2013 |
| WO | 2014/018976 A1 | 1/2014 |

OTHER PUBLICATIONS

International Search Report for International Application No. PCT/NZ2015/050160 dated Nov. 6, 2015 (3 pages).
International Written Opinion for International Application No. PCT/NZ2015/050160 dated Nov. 6, 2015 (4 pages).
Casanova et al., "Transmitting Coil Achieving Uniform Magnetic Field Distribution for Planar Wireless Power Transfer System," IEEE, 2009.
Yu et al., "Watt-Level Wireless Power Transfer Based on Stacked Flex Circuit Technology," IEEE: Electronic Components & Tech. Conf. 2011.

\* cited by examiner

TRANSMITTER FOR INDUCTIVE POWER TRANSFER SYSTEM

This application is a National Stage Application of PCT/NZ2015/050160, filed 22 Sep. 2015, which claims benefit of U.S. Ser. No. 62/055,924, filed 26 Sep. 2014 and which applications are incorporated herein by reference. To the extent appropriate, a claim of priority is made to each of the above disclosed applications.

FIELD OF THE INVENTION

The present invention is in the field of an inductive power transfer (IPT) system. More particularly, the invention relates to a power transmitter—having a novel configuration—for use in such systems.

BACKGROUND OF THE INVENTION

IPT systems are a well known area of established technology (for example, wireless charging of electric toothbrushes) and developing technology (for example, wireless charging of handheld devices on a 'charging mat'). Typically, a primary side generates a time-varying magnetic field from a transmitting coil or coils. This magnetic field induces an alternating current in a suitable receiving coil that can then be used to charge a battery, or power a device or other load. In some instances, it is possible for the transmitter or the receiver coils to be connected with capacitors to create a resonant circuit, which can increase power throughput and efficiency at the corresponding resonant frequency.

A basic problem that must be overcome in IPT system design is ensuring efficient power transfer. One approach to improve performance has been to require precise alignment of the transmitter and receiver coils, such as in the case of wireless charging of electric toothbrushes that use a dedicated charging mount. However, requiring precise alignment undermines one of the key objectives of some IPT systems, which is uncomplicated charging and powering of devices, with minimal user participation.

Another type of IPT system is a charging (or powering) pad. Typically, these systems provide a surface that is configured to produce a magnetic field such that when a suitable device is placed on the surface, power is drawn by a suitable receiver coil arrangement within the device. There are various transmitting coil configurations that are known. In one example, a single coil is placed beneath, and coplanar to, the surface. The coil might be small, and thus the receiver coil must still be reasonably well aligned to achieve power transfer. Alternatively, the coil might be large, covering the entire area of the surface. In this instance, one or more receivers can be placed anywhere on the surface. This allows more freedom in terms of charging or powering a device (ie a user only has to set the device down anywhere on the mat). However, the magnetic field produced by such a configuration is not uniform, and can be particularly weaker towards the centre of the coil. Therefore, receiver coils derive different amounts of power depending on their location on the surface.

A third type of IPT system is a charging (or powering) enclosure. Typically, these systems provide a box with transmitter coils incorporated into the wall and or base of the box. The coils generate a magnetic field within the box, such that when a device is placed within the box, power is drawn by a suitable receiver coil arrangement within the device. The coils could be an array of coils, or a large coil, or a combination both. However, the same disadvantages as with a charging pad can arise. That is, the field is not uniform throughout the volume, being particularly weaker towards the centre. Thus, to ensure sufficient power transfer even when a device is placed in the centre of the enclosure, the power on the primary side must be higher, which results in increased losses and decreased efficiency.

In all of the above scenarios, it is known that a layer/core made of a material of high magnetic permeability (such as ferrite) can be included in the transmitter or receiver to improve the transfer of energy over the magnetic field.

It is an object of the invention to provide a transmitter that produces a magnetic field with improved power transfer characteristics, or to at least provide the public with a useful choice.

SUMMARY OF THE INVENTION

According to one exemplary embodiment there is provided an inductive power transfer transmitter including: an enclosure for accommodating devices to be energised having one or more side walls; one or more coils for generating an alternating magnetic field within the enclosure, the density of the one or more coils varying with distance from an end of the one or more sidewalls; and a drive circuit for driving the one or more coils.

According to another exemplary embodiment there is provided an inductive power transfer transmitter including: an enclosure for accommodating devices to be energised having a base portion and one or more side walls projecting from the base; one or more coils for generating an alternating magnetic field within the enclosure, the density of the one or more coils initially decreasing with increased distance from the base portion and then increasing with further increased distance from the base portion; and a drive circuit for driving the one or more coils.

According to another exemplary embodiment there is provided an inductive power transmitter including: one or more coils for generating an alternating magnetic field; a drive circuit for driving the one or more coils; and one or more magnetically permeable layers associated with the one or more coils, wherein the combined thickness of the one or more magnetically permeable layers varies.

According to a further exemplary embodiment there is provided an inductive power transmitter including: one or more coils for generating an alternating magnetic field; a drive circuit for driving the one or more coils; and one or more magnetically permeable layer associated with the one or more coils, wherein the permeability of the one or more magnetically permeable layers varies.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—ie they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings, which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Coil Arrangement

Figure 1:
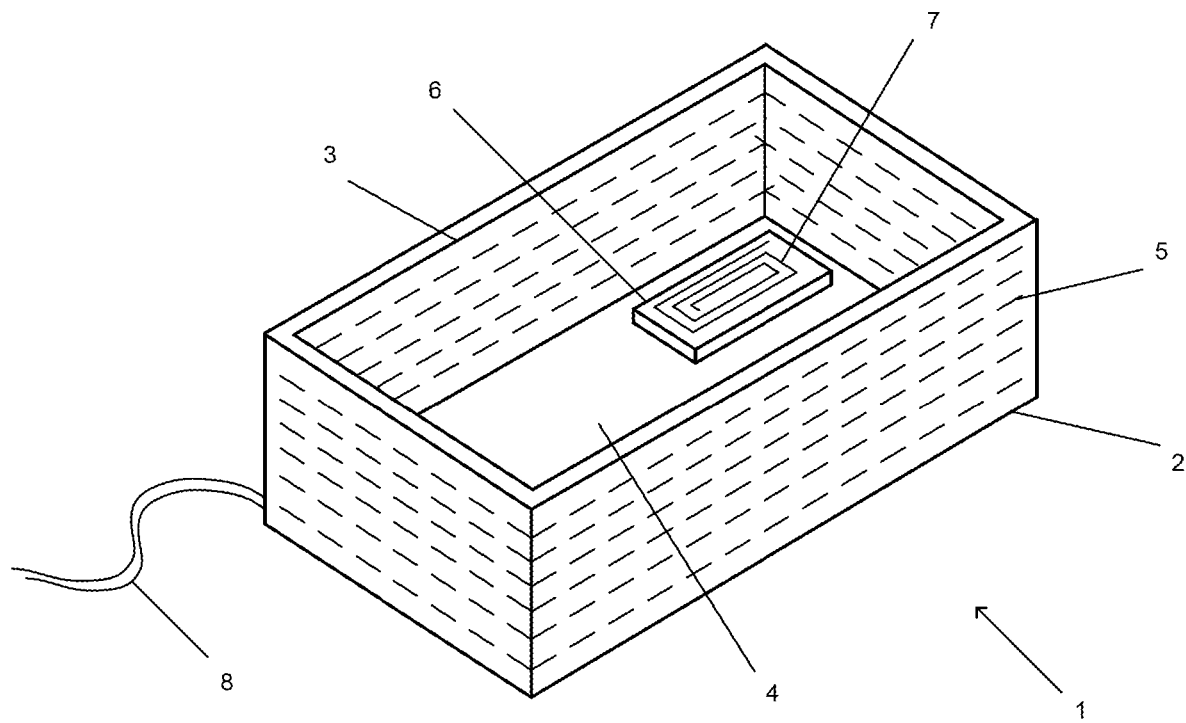
FIG. 1 shows a view of a transmitter according to an embodiment of a first aspect of the present invention.

Referring to FIG. 1, there is shown a transmitter 1 for an IPT system according to an embodiment of the present invention. The transmitter takes the form of a charging enclosure 2 with sidewalls 3 and a base portion 4. The transmitter includes a coil 5 that generates a time-varying magnetic field inside the enclosure. A device 6, placed inside the enclosure, includes a receiver coil 7, which inductively couples with the time-varying magnetic field and produces a current that can be used to charge or power the device. The coil is contained with the sidewalls of the enclosure, and is wound about the perimeter of the enclosure, coplanar with the base portion, as shown by the dashed lines in FIG. 1.

The transmitter 1 is connected to a suitable power supply 8, and drive circuitry (not shown) is configured to drive the coil so that it generates the magnetic field. The drive circuitry is configured such that the coil 5 generates a time-varying magnetic field appropriate for the particular application. Such drive circuitries are known to those skilled in the art, and the invention is not limited in this respect.

Devices capable of receiving inductively transferred power are well known in the art, and the present invention is not limited to any particular type. In a preferred embodiment, the device includes a receiver coil that is coplanar with the base portion since this will maximise power transfer where the flux of the magnetic field are perpendicular to the base portion.

Figure 2:
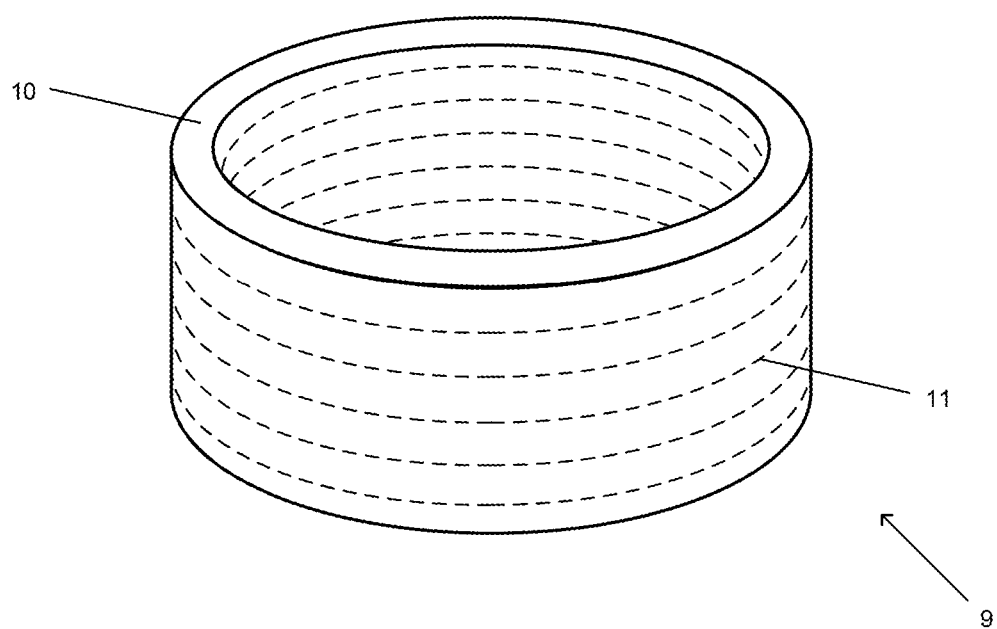
FIG. 2 shows a view of a transmitter according to another embodiment of the first aspect of the present invention shown in FIG. 1.

The shape of the enclosure 2 shown in FIG. 1 takes the form of a rectangular prism; however the invention is not limited in this respect. Those skilled in the art will appreciate how the present invention can be made to apply to a variety of three-dimensional volumes that define an enclosure. By way of example, FIG. 2 shows a transmitter 9 where the enclosure is of a cylindrical form, having a single continuous sidewall 10. In this example, the coil 11 is generally circular and is wound around the perimeter of the enclosure, as indicated by the dashed lines in FIG. 2.

In a preferred embodiment of the invention, the enclosure includes the base portion 4. As will be described later, the inclusion of a magnetically permeable layer (such as a ferrite layer) in the base portion can significantly improve power transfer. However, it is not necessary for the enclosure 2 to include a base portion. Those skilled in the art will appreciate how the present invention can be adapted for charging enclosures that do not include a base portion.

Figure 3:
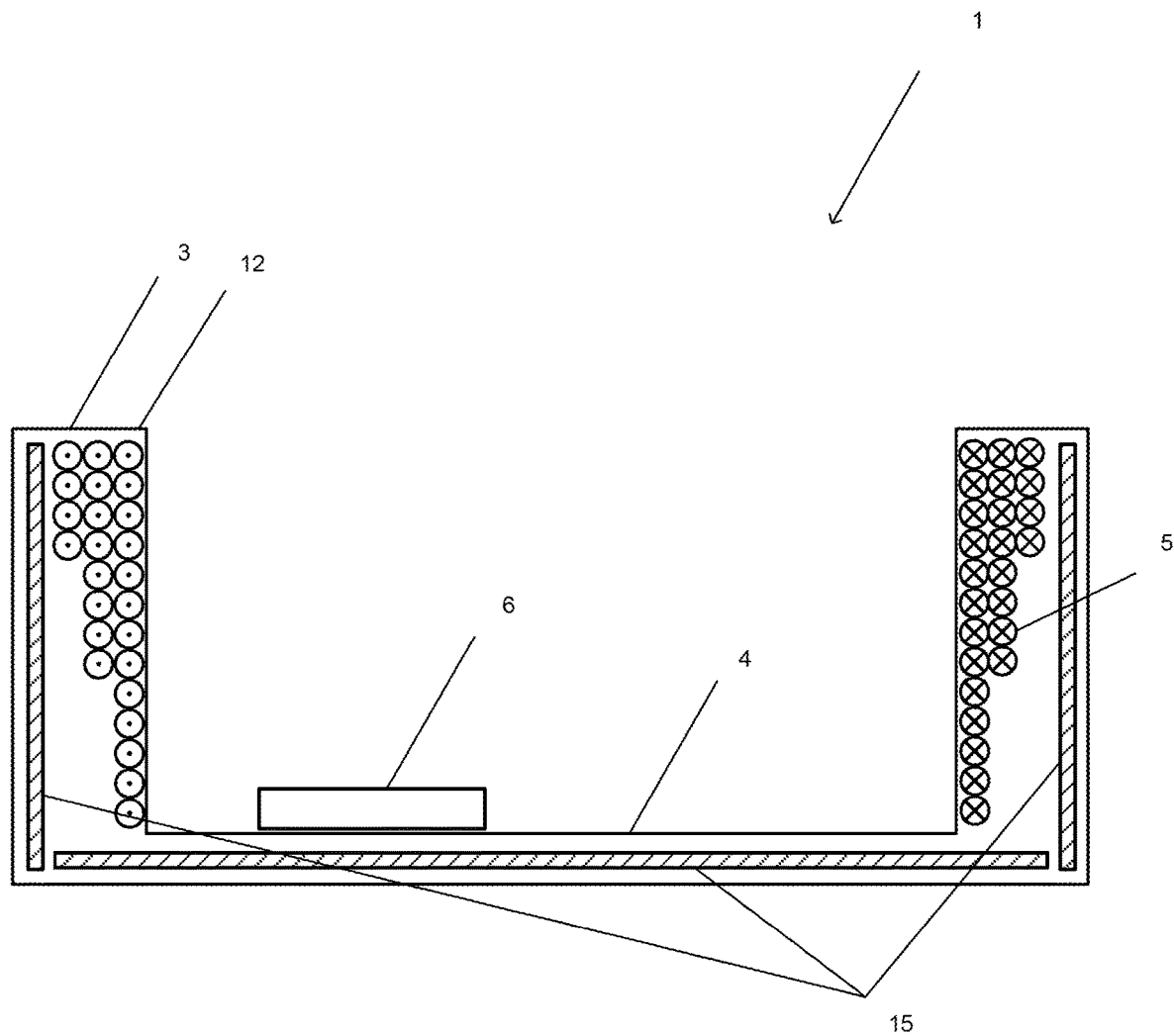
FIG. 3 shows a cross-sectional view of the transmitter shown in FIG. 1.

Referring to FIG. 3, there is shown a vertical cross section of the transmitter 1 shown in FIG. 1. This view shows the sidewalls 3, base portion 4, coil 5 and device 6. The enclosure can optionally include a suitable outer layer 12 (for example a plastic housing) that encloses the inner workings of the transmitter giving the transmitter a more attractive and streamlined appearance. The coil is arranged so that the density of the coil (being the number of loops per unit height) generally increases with height. This results in more loops being 'concentrated' towards the top of the sidewalls. The number of loops shown in FIG. 3 is relatively few as this best serves to illustrate the principle of the invention. In reality, the number of loops is not limited in any respect, and those skilled in the art will appreciate that in some applications the number of loops can be in the hundreds or even thousands.

Alternatively, in another embodiment of the invention, the coil can be configured so that the density varies with height in some other manner. For example, it is consistent with the present invention for the density of the coil to increase initially with height, then to decrease again towards the top of the side walls. Such an alternative embodiment is described later.

The coil 5 is continuous and is connected in series to the drive circuitry (not shown). In an embodiment of the invention, the coil is comprised of a single length of wire that is repeatedly wound to form a series of loops. In one embodiment of the invention, the single length of wire comprises sections of wire of varying gauge. The sections of wire can be connected together in a suitable way (for example, soldered) such that the length of wire graduates from the largest diameter through to the narrowest diameter. Thus, if the wire is wound according to the coil configuration shown in FIG. 3, the narrower sections of the wire correspond to the loops that have a higher density. Since the wire is narrower, it occupies less space than if the wire had a consistent gauge. The wire can be any suitable current carrying wire, including Litz type wire. Litz wire is beneficial because it greatly reduces the power losses caused by skin effect and proximity effect in conductors when operated at high frequencies in IPT systems. In another embodiment of the invention, there is more than one coil. Each coil can be connected in series, parallel or other suitable configuration. Overall, the net density of the coils (being the number of loops per unit height) can still vary in accordance with the present invention.

Figure 4A:
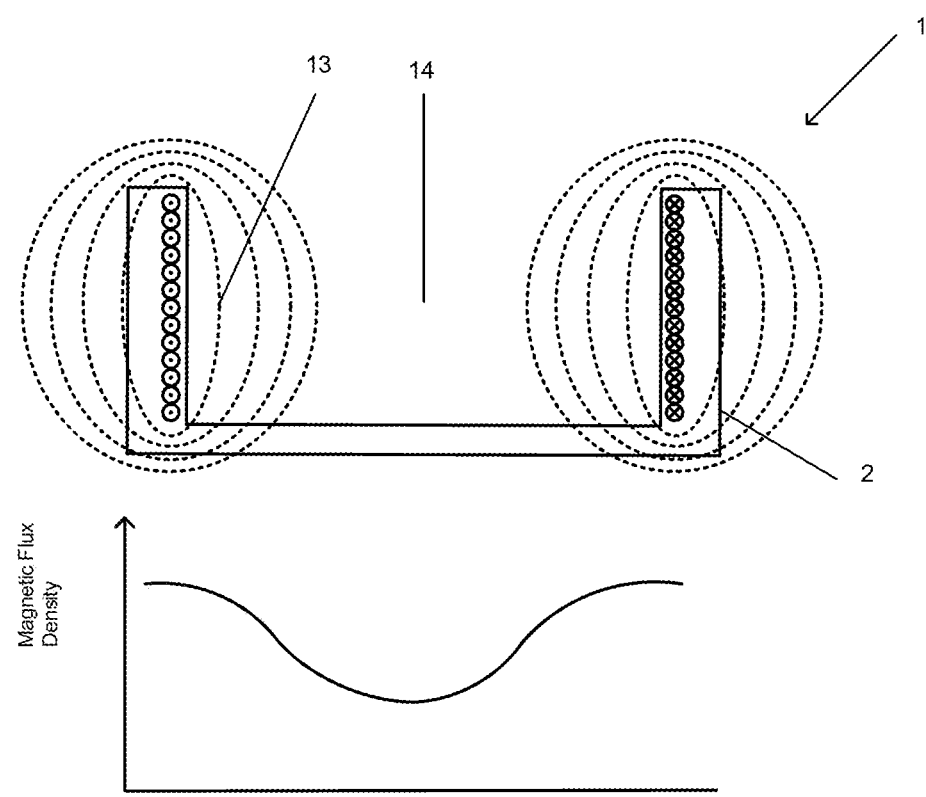
FIG. 4 shows a schematic comparing the magnetic field lines generated by two different transmitters.
Figure 4B:
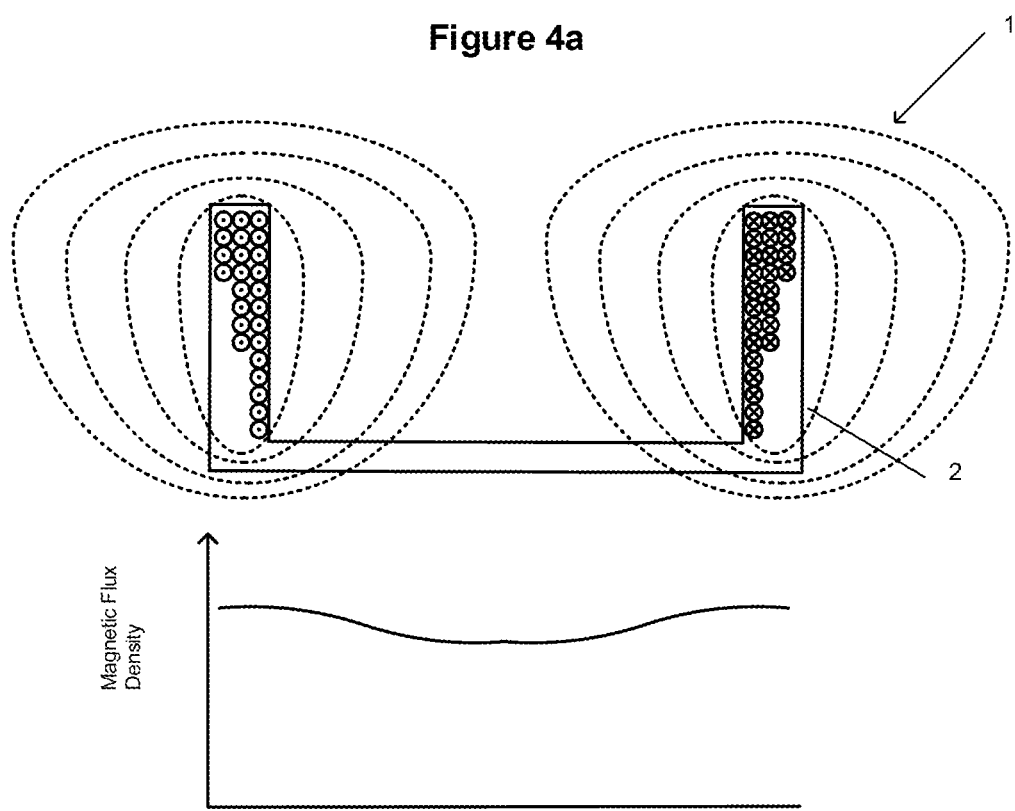

The benefit of the present invention can be seen in FIGS. 4a and 4b, which show a vertical cross-section of a transmitter 1 according to an embodiment of the present invention. FIGS. 4a and 4b illustrate a comparison between the magnetic fields produced by a coil arrangement with uniform density and a coil arrangement according to the present invention respectively. It will be observed that for the former scenario in FIG. 4a, the magnetic flux is concentrated towards the walls of the enclosure 13, with there being a region of lower magnetic flux towards the centre 14. Hence, to ensure sufficient power transfer to receivers that are placed in this central region, the power flow through the transmitter must be increased. This results in inefficient use of supply power. Further, receivers that are placed closer to the enclosure side walls are subjected to a stronger magnetic field than those placed at the centre. This requires receivers to regulate their power flow dependent on their precise location within the enclosure. It also increases parasitic heating in the device. FIG. 4b demonstrates the magnetic field according to the coil arrangement of the present invention. As will be observed, the variable coil density results in a more uniform magnetic field across the enclosure. Effectively, the additional windings make the magnetic field extend further into the enclosure. This helps resolve the issues arising from the non-uniform field described above. In particular, the power flow through the transmitter can be decreased whilst still ensuring sufficient power transfer to the receiver, regardless of its placement inside the enclosure. Having decreased power flow in the transmitter minimises inefficiencies and lessens parasitic heating. Those skilled in the art will understand that the field shown in FIG. 4b is qualitative in order to demonstrate the principle of the invention. In practice, the precise coil arrangement that is required to achieve the desired field characteristics is dependent on many variables, such as dimensions and the power rating. It will be appreciated that the design of the coil arrangement will need to be adjusted to suit the particular application.

Returning to FIG. 3, there is also shown ferrite layers 15 within the sidewalls 3 and base portion 4 of the charging enclosure. Those skilled in the art will appreciate how the inclusion of magnetically permeable layers can improve the performance of the power transfer. Particularly, a magnetically permeable layer in the base portion 'compels' the magnetic field lines to distribute closer to the centre. This helps provide a more uniform field and improve power transfer across the entire base portion area.

Figure 5:
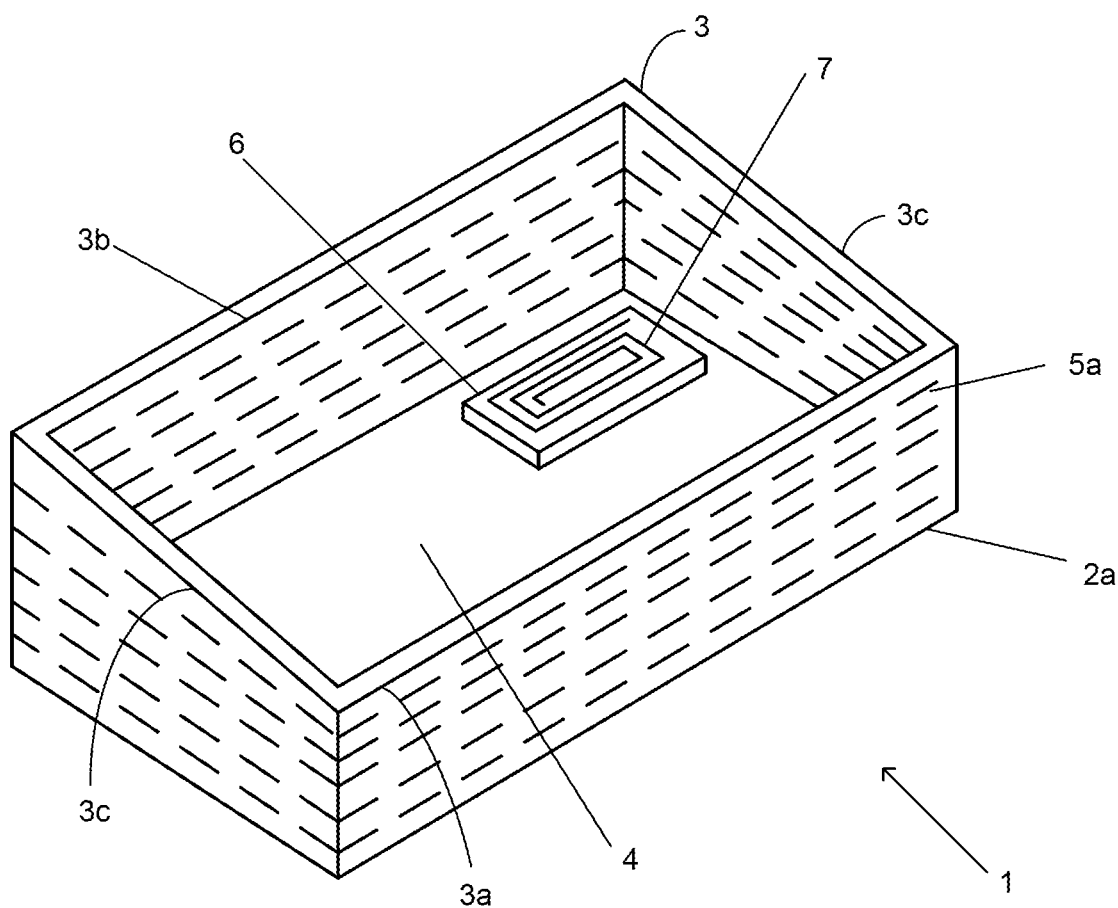
FIG. 5 shows a view of a transmitter according to an embodiment of another aspect of the present invention.

Referring to FIG. 5, there is shown a transmitter 1 according to another aspect of the present invention. In this instance, the transmitter is a charging enclosure 2a which is similar to the charging enclosure 2 described earlier, however the charging enclosure 2a has an irregular shape not a rectangular prism shape as in the FIG. 1 embodiment. That is, the enclosure includes sidewalls 3 and a base portion 4 where one of the sidewalls 3a is a different size than an opposing sidewall 3b such that the joining sidewalls 3c have a slanted upper face. The terms upper and lower are used in relation to the base portion 4. The actual shape of the enclosure 2a depends on the specific application of the transmitter, however it is to be understood that the configurations of the coils and permeable material described herein in relation to the present invention are applicable to situations in which the enclosure is irregularly shaped.

As will be described later, the inclusion of a magnetically permeable layer (such as a ferrite layer) in the base portion can significantly improve power transfer. However, like the embodiment of FIG. 1 it is not necessary for the enclosure 2a to include a base portion. Those skilled in the art will appreciate how the present invention can be adapted for charging enclosures that do not include a base portion.

A coil 5 that generates a time-varying magnetic field inside the enclosure 2a is contained with the sidewalls of the enclosure, and is wound about the perimeter of the enclosure, coplanar with the base portion, as shown by the dashed lines in FIG. 5. The irregular shape of the enclosure 2a requires a winding configuration of the coil 5 that accommodates the irregular shape whilst generating a magnetic field that encompasses substantially all of the interior of the enclosure in a substantially uniform manner. As illustrated in FIG. 5, this is achieved by ensuring that the windings of the coil 5 follow the upper face of the sidewall portions 3a, 3b and 3c in at least the upper portion of the enclosure 2a and by employing the afore-described varying density of the coil arrangement. Accordingly, a device 6, placed inside the enclosure 2a, including a receiver coil 7, will inductively couple with the time-varying magnetic field to allow charging or powering of the device regardless of the relative positioning of the device within the enclosure.

The transmitter 1 is connected to a suitable power supply, and drive circuitry (not shown) is configured to drive the coil so that it generates the magnetic field. The drive circuitry is configured such that the coil 5 generates a time-varying magnetic field appropriate for the particular application. Such drive circuitries are known to those skilled in the art, and the invention is not limited in this respect.

Figure 6:
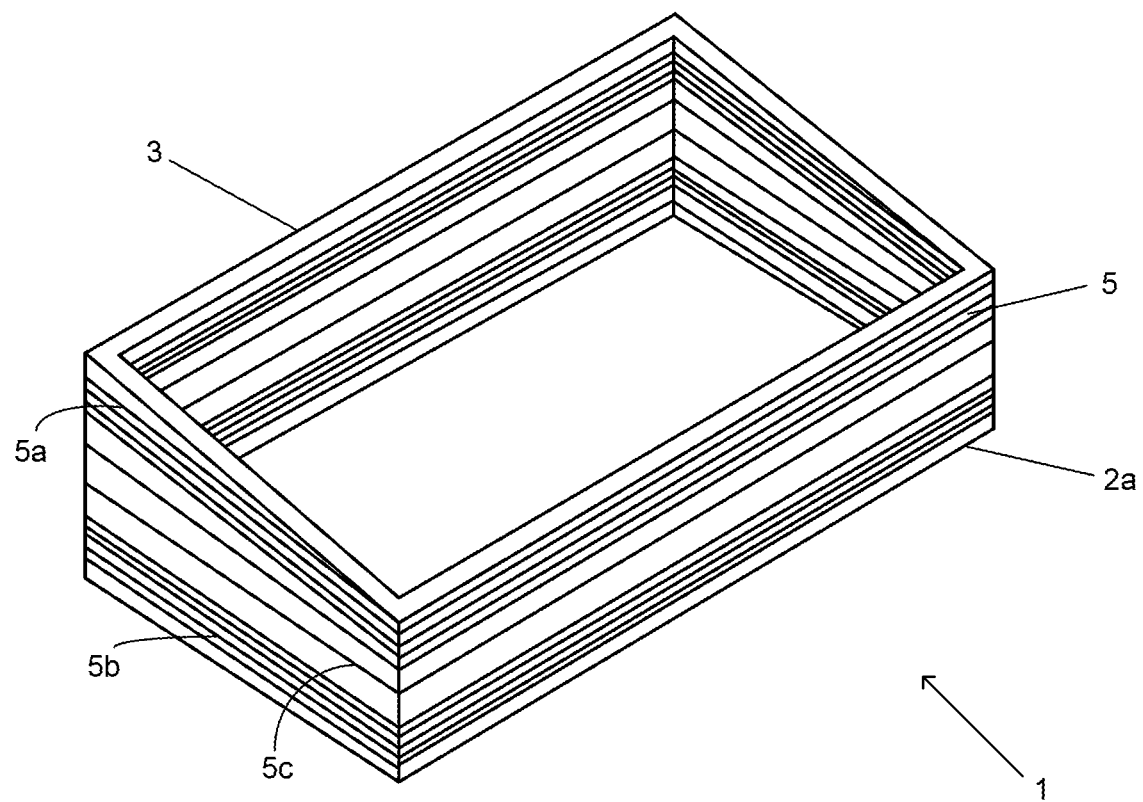
FIG. 6 shows a view of a transmitter according to an embodiment of another aspect of the present invention.

Further enhancement of the uniformity of the magnetic field induced by the transmitter coil can be achieved using a coil arrangement as illustrated in FIG. 6 which shows the transmitter 1 of FIG. 5. In FIG. 6, the coil 5 is illustrated in solid lines to aid description. As can be seen the winding configuration of the coil 5 accommodates the irregular shape of the enclosure 2a as before, but a different varying density arrangement (being the number of loops per unit height) is used than those depicted in the embodiments of FIGS. 1 and 5. That is, unlike the earlier embodiments in which the density of the coil windings increases monotonically from the base portion 4 to the upper face of the sidewalls 3, the density of the coil windings in the FIG. 6 embodiment is increased at both the lower and upper portions of the sidewalls 3 and is decreased in the middle portion of the sidewalls. That is, the windings in portion 5a at the upper portion of the enclosure and in portion 5b at the lower portion of the enclosure are more closely spaced than the windings in portion 5c at the middle portion of the enclosure. This results in more loops being 'concentrated' towards the top and bottom of the sidewalls. The number of loops shown in FIG. 6 is relatively few as this best serves to illustrate the principle of the invention. In reality, the number of loops is not limited in any respect, and those skilled in the art will appreciate that in some applications the number of loops can be in the hundreds or even thousands. The inventor has found that this alternative coil winding configuration provides even better uniformity in the induced magnetic field. This configuration also allows irregularities in the enclosure shape, dimensions and configuration to be accommodated whilst providing the required field within the enclosure.

Figure 7:
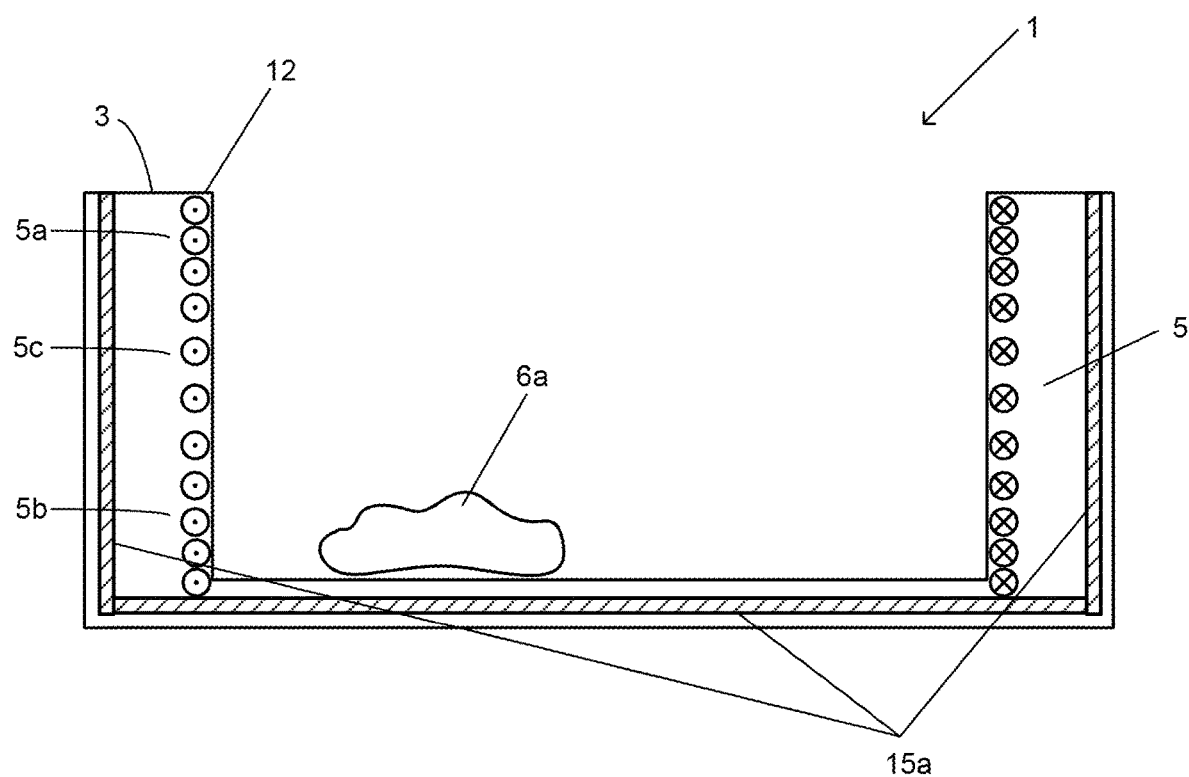
FIG. 7 shows a cross-sectional view of the transmitter shown in FIG. 6.

Referring to FIG. 7, there is shown a vertical cross section of the transmitter 1 shown in FIG. 6. This view shows the sidewalls 3, base portion 4, coil 5 and a device 6a. The enclosure can optionally include a suitable outer layer 12 (for example a plastic housing) that encloses the inner workings of the transmitter. The outer layer 12 may be a casing for the transmitter 1 itself or may be part of a component of a vehicle interior or other infrastructure. The device 6a is illustrated as an arbitrarily shaped item rather than the generally rectangular item of the device illustrated in the earlier drawings. The arbitrary shape of the device 6a is used to illustrate that the uniformity of the magnetic field induced by the transmitter of the various embodiments of the present invention is such that effective wireless or inductive power transfer is achieved independent of the shape and/or the relative orientation of the receiver coil(s) in the device(s) to the transmitter coil(s).

Figure 8:
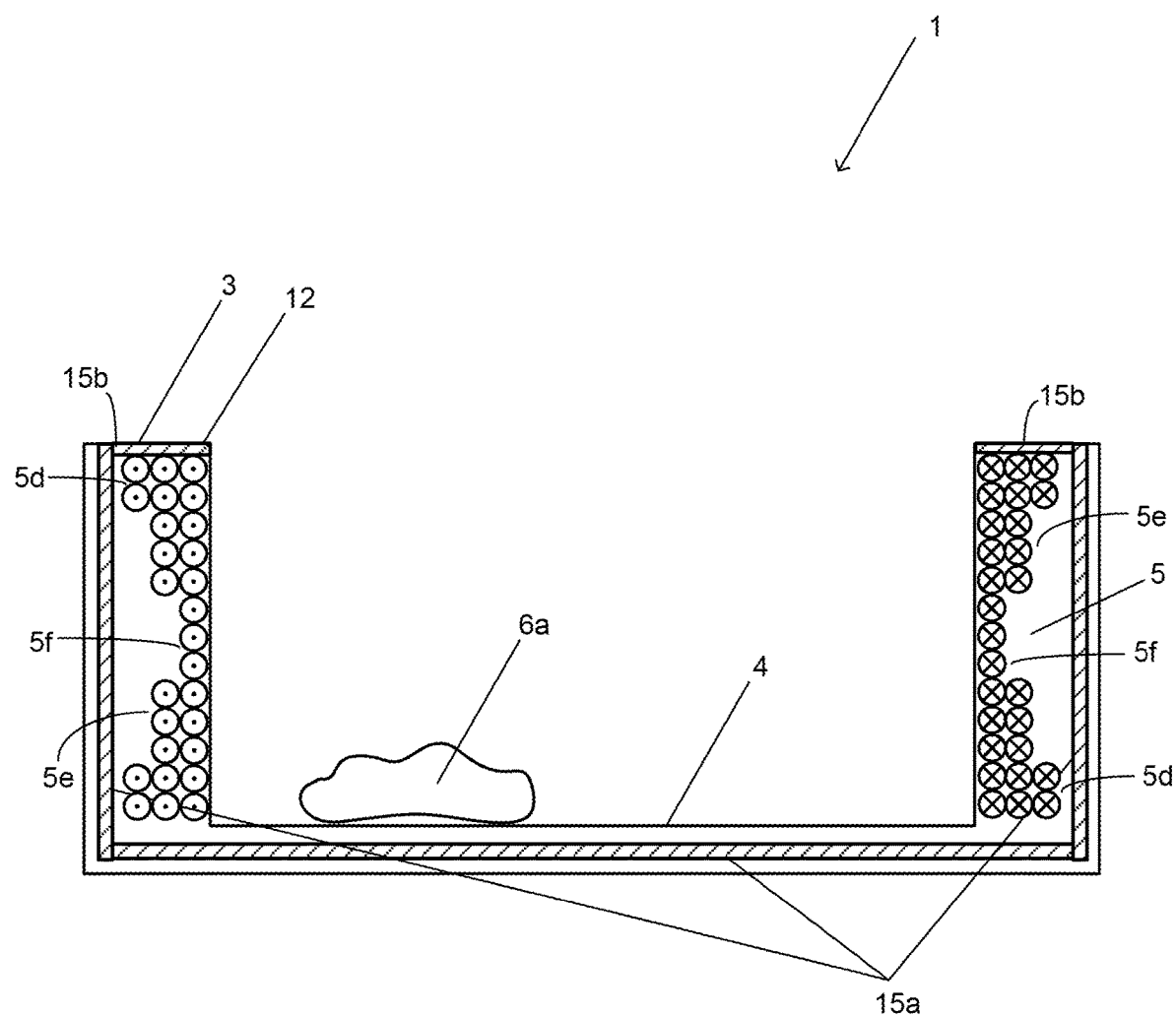
FIG. 8 shows a cross-sectional view of another embodiment of the transmitter shown in FIG. 6.

The coil 5 of FIGS. 5 and 6 may be continuous and connected to the drive circuitry (not shown). In one embodiment, the coil is a single length of wire that is repeatedly wound to form a series of loops with the loops being closer together at coil portions 5a and 5b at the lower and upper portions of the sidewalls and further apart at the coil portion 5c at the middle portion of the sidewalls, as shown in FIG. 7. In another embodiment, the coil 5 may have sections of wire of varying gauge, as shown in FIG. 8. That is, sections 5d at the highest and lowest portions of the sidewalls are thicker than adjacent sections 5e which are thicker than section 5f at the middle portion of the sidewalls. These sections of wire can be connected together in a suitable way (for example, soldered) such that the length of wire graduates from the largest diameter through to the narrowest diameter and again to the largest diameter over the height of the sidewalls. The wire can be any suitable current carrying wire, including Litz type wire. In another embodiment of the invention, there is more than one coil. Each coil can be connected in series, parallel or other suitable configuration. Overall, the net density of the coils (being the number of loops per unit height) can still vary in accordance with the present invention.

Figure 7A:
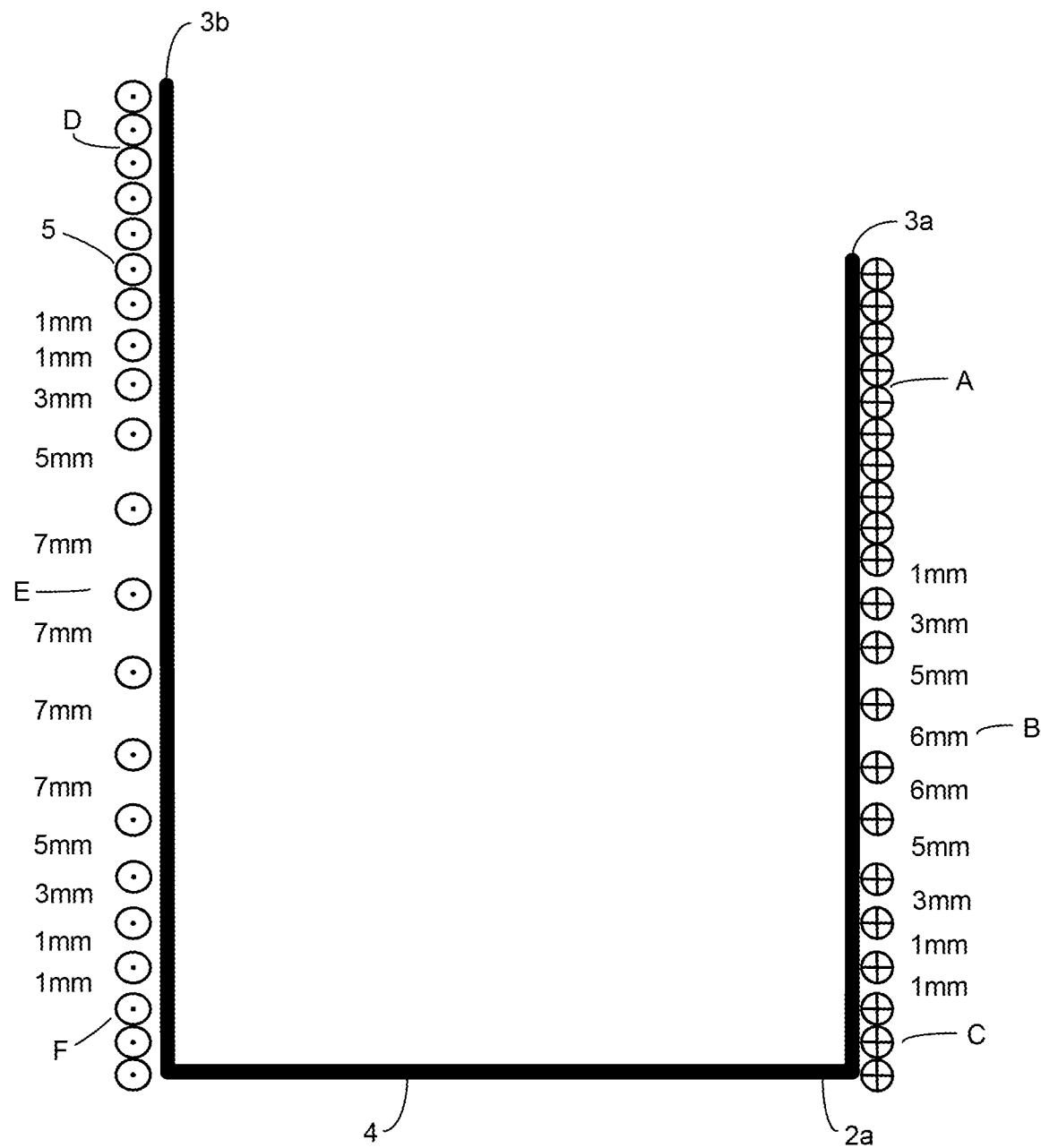
FIG. 7a shows a cross-sectional view of a portion of a transmitter according to an embodiment of the aspect shown in FIG. 6.

With the coil configuration illustrated in FIG. 7, the inventor found that certain numbers of loops or turns, spacing between adjacent turns in the increased density portions 5a and 5b and certain gradations from the increased to decreased density portions provide optimised manipulation of the induced magnetic field. FIG. 7a shows an exemplary embodiment of the transmitter having an enclosure with the non-regular configuration depicted in FIGS. 5 and 6, with like reference numerals used. In the example of FIG. 7a, 21 turns of the coil 5 are provided with the increased to decreased to increased coil density gradations with height from the base portion 4 of the enclosure 2a, where the gradations are dependent on the local configuration of the enclosure 2a. That is, as can be seen the gradations on the "higher" side of the enclosure are different than the gradations on the "lower" side of the enclosure.

In particular, in this example, portion A of the coil 5 nearest the opening (e.g., the top of the charging "box", where top is defined relative to the base portion) of the enclosure 2a on the lower sidewall 3a has ten turns of most coil density where adjacent turns of the coil are in contact with one another, i.e., there is substantially no space between adjacent turns, however portion D of the coil 5 nearest the opening of the enclosure 2a on the higher sidewall 3b has seven turns of most coil density where adjacent turns of the coil are in contact with one another. On the lower side, this spacing between adjacent coil-turns increases to about 1.0 mm for one turn whereas on the higher side the spacing increases to about 1.0 mm for two turns. The gradation continues with the spacing increasing to about 3.0 mm between adjacent coil-turns for one turn on both the low and high sides, and then about 5.0 mm for one turn on both sides.

In portion B of the coil in a middle part of the enclosed volume (e.g., the charging "box") on the lower side three turns of least coil density are provided where adjacent turns of the coil are about 6.0 mm apart, whereas in portion E of the coil 5 in the middle part on the higher side five turns of least coil density are provided where adjacent turns of the coil are about 7.0 mm apart. The gradation continues with the spacing decreasing on both the low and high sides to about 5.0 mm between adjacent coil-turns for one turn, then about 3.0 mm for one turn, and then about 1.0 mm for two turns. Finally, portions C and F of the coil 5 nearest the base portion 4 of the enclosure 2a on the lower sidewall 3a and higher sidewall 3b, respectively, have three turns each of most coil density where adjacent turns of the coil are in contact with one another, i.e., there is substantially no space between adjacent turns.

This configuration provides 21 total turns with 20 individual spacings between adjacent turns from about 0.0 mm to about 7.0 mm depending on the distance from the base portion of the enclosure. As is understood, the relative spacings carry through on the "slanted" sides of the enclosure, as depicted in FIG. 6, for example.

Figure 9:
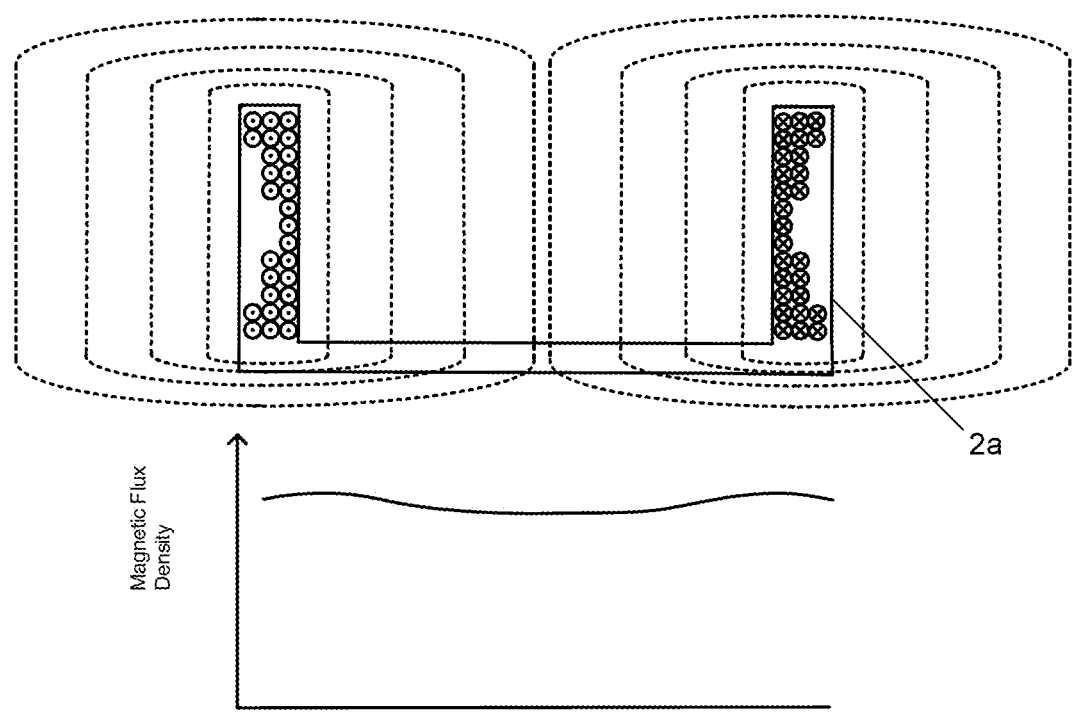
FIG. 9 shows a schematic of the magnetic field lines generated by the transmitter of FIG. 6.

The benefit of the present embodiment of the present invention can be seen in FIG. 9, which shows a vertical cross-section of a transmitter 1 having the coil arrangement of FIG. 8 and the magnetic field produced therewith. By comparing the magnetic field produced by the coil arrangement of FIG. 9 with that produced by the coil arrangement depicted in FIG. 4a, it can be seen that unlike the example of in FIG. 4a where the magnetic flux is concentrated towards the walls of the enclosure 13 with a region of lower magnetic flux towards the centre 14, in the arrangement of the present embodiment, the magnetic flux is more uniform across the interior of the enclosure 2a. Effectively, the additional windings make the magnetic field extend further into the enclosure. This helps resolve the issues arising from the non-uniform field of FIG. 4a discussed earlier. In particular, the power flow through the transmitter of the present invention can be decreased relative to that of FIG. 4a whilst still ensuring sufficient power transfer to the receiver, regardless of its placement inside the enclosure. Having decreased power flow in the transmitter minimises inefficiencies and lessens parasitic heating. Those skilled in the art will understand that the magnetic field shown in FIG. 9 is qualitative in order to demonstrate the principle of the invention. In practice, the precise coil arrangement that is required to achieve the desired field characteristics is dependent on many variables, such as dimensions and the power rating. It will be appreciated that the design of the coil arrangement will need to be adjusted to suit the particular application.

Returning to FIGS. 7 and 8, there is also shown magnetically permeable material elements 15a within the sidewalls 3 and base portion 4 of the charging enclosure 2a. Those skilled in the art will appreciate how the inclusion of magnetically permeable material, such as ferrite, can improve the performance of the power transfer. Particularly, suitable magnetically permeable material 'compels' the magnetic field lines to distribute closer to the centre. This helps provide a more uniform field and improve power transfer across the entire base portion area. It also blocks or shields the generation of (electro)magnetic fields external to the transmitter enclosure. This enhances the safety of the transmitter and also the compatibility of the use of the transmitter in environments having other electronic or metallic componentry, such as a vehicle interior. This shielding effect is enhanced by ensuring that there are no gaps between the elements 15a, as depicted in FIGS. 7 and 8. Further enhancement can be provided by providing further portions 15*b* of the magnetically permeable material element(s) which envelope the transmitter coil(s) 5 in the region of the upper face of the sidewalls, as depicted in FIG. 8. A movable lid of, or having, magnetically permeable material could also be provided. Effective shielding is also provided by the configuration of the elements 15 in the FIG. 3 embodiment, and the embodiments to be described later. It is noted that some applications of the transmitter may require gaps in the casing, of which the magnetically permeable material elements form part, in order to accommodate the shape/configuration of the enclosure and power connections, such as the connection 8 in FIG. 1. In either application where gaps can be avoided or are necessary, the magnetically permeable material elements may be formed as a single unit rather than separate elements, by moulding or other techniques well known to those skilled in the art.

The afore-described charging/powering enclosures do not have to be a free standing apparatus and could be incorporated into pre-existing or specifically designed structures. By way of example, a desk drawer could be constructed in accordance with the present invention, and thus a user would only need to place their electronic devices in the drawer and they could be recharged or powered. In a further example, a console or other like component of a vehicle interior could be configured to incorporate a transmitter enclosure in accordance with the present invention, and thus a user would only need to place their electronic devices in the vehicle console or like component to allow recharging or powering of the devices.

Magnetically Permeable Layer—Variable Thickness

Figure 10:
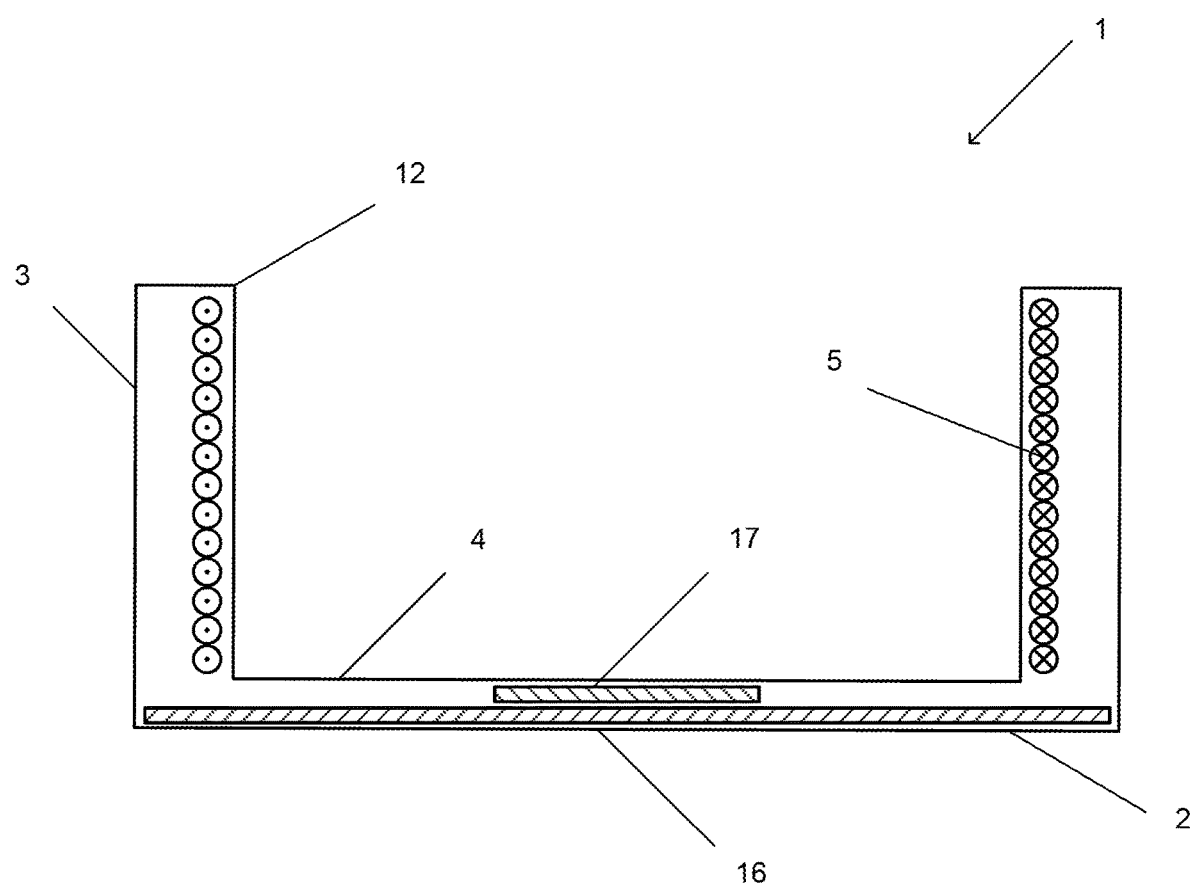
FIG. 10 shows a cross-sectional view of a transmitter according to another aspect of the present invention.

Referring to FIG. 10, there is shown a cross-section of a transmitter 1 according to another aspect of the present invention. In this instance, the transmitter is a charging enclosure similar to the charging enclosure 2 described with respect to the earlier embodiments. The enclosure includes sidewalls 3 and a coil 5 that is wound around the perimeter of the enclosure, all housed within a suitable outer layer 12. Included in the base portion 4 is a main magnetically permeable layer 16. As described earlier, including a magnetically permeable layer can improve power transfer by essentially 'reshaping' the magnetic field. Further to this main magnetically permeable layer, there is an additional magnetically permeable layer 17 situated adjacent to the main magnetically permeable layer.

Figure 11A:
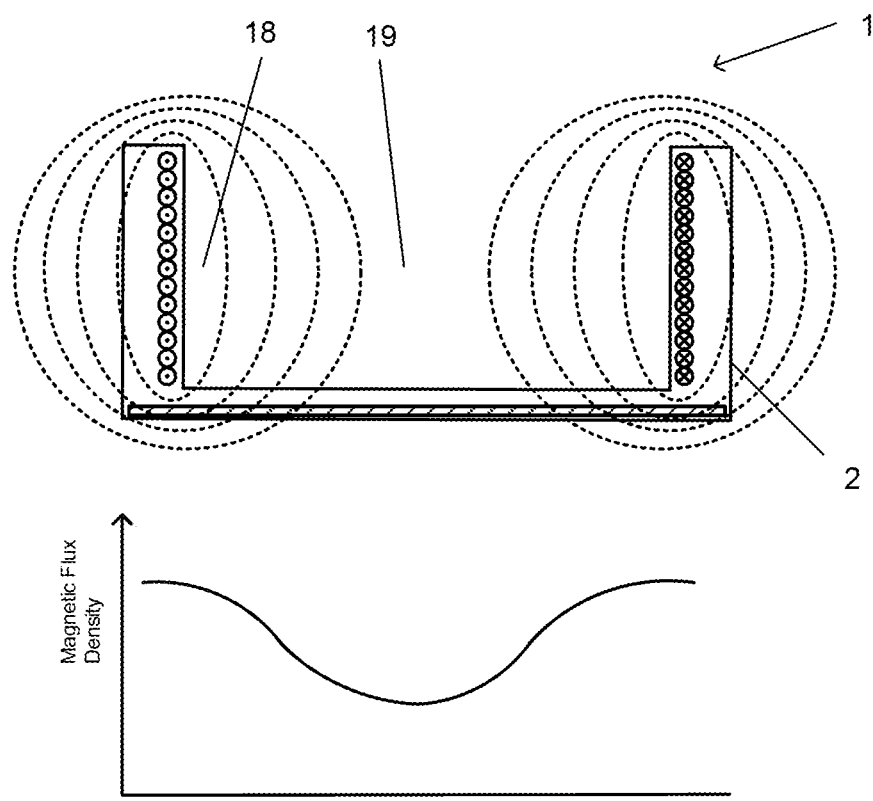
FIG. 11 shows a schematic comparing the magnetic field lines generated by two different transmitters.
Figure 11B:
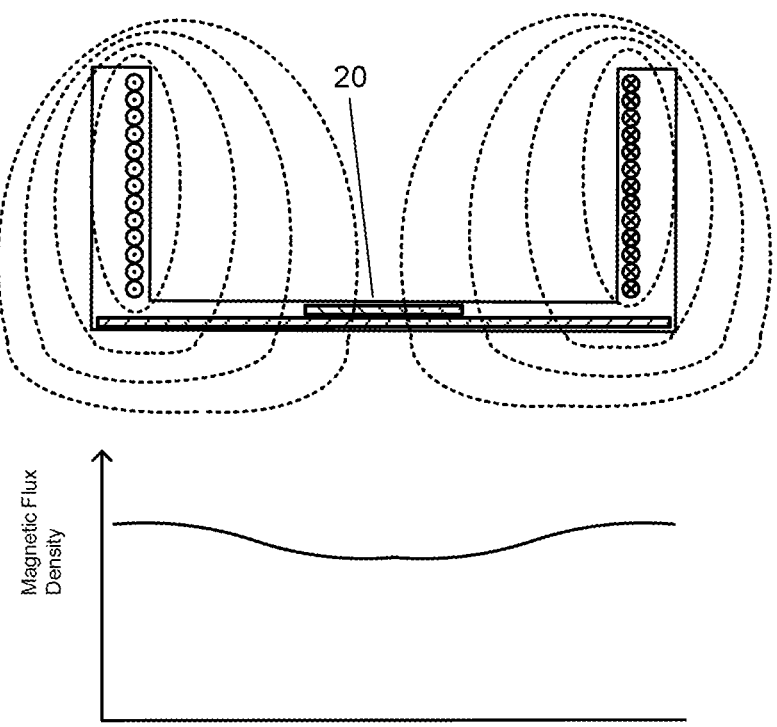

The result of including the additional magnetically permeable layer 17 is to increase the effective thickness of the magnetically permeable layer towards the centre of the charging enclosure 2. In the embodiment of the invention shown in FIG. 10, this helps improve power transfer by further compelling the magnetic field towards the centre of the charging enclosure, resulting in a more uniform magnetic field. This is demonstrated by a comparison of the magnetic field lines as shown in FIGS. 11*a* and 11*b*. It will be observed that for the former scenario in FIG. 11*a*, the magnetic flux is concentrated towards the walls of the enclosure 18, with there being a region of lower magnetic flux towards the centre 19. This raises the same problems as that described in relation to FIG. 4*a* earlier. FIG. 11*b* demonstrates the magnetic field according to the magnetically permeable layer arrangement of the present invention. As will be observed, the increased thickness of the magnetically permeable layer towards the centre 20 of the enclosure 2 results in a more uniform magnetic field. The mechanism by which this occurs is that the inclusion of the additional magnetically permeable layer raises the height of the magnetically permeable layer, which results in a shorter magnetic path through the air for field lines that pass towards the centre of the enclosure. In effect, the magnetic field is 'attracted' towards the centre. Equivalently, the thicker magnetically permeable layer provides a magnetic path with a longer section of decreased reluctance; hence the magnetic field will be compelled towards this region. The more uniform magnetic field helps resolves the issues arising from the non-uniform field, as described in relation to FIG. 4*a* earlier.

Referring again to FIG. 10, it is seen that the increase in the effective thickness of the magnetically permeable layer is achieved by including a supplementary block 17. Those skilled in the art will appreciate that the relative size of the supplementary block depends on the scale and dimensions of the particular transmitter. Also, those skilled in the art will appreciate that in some applications it may be suitable to stack a series (ie three or more) of supplementary blocks of decreasing size on top of each other, resulting in a 'step-pyramid' type configuration, wherein the effective thickness varies in a sequence of discrete steps.

In an alternative embodiment of the invention, the magnetically permeable layer may be originally manufactured with a variable thickness. In this instance, the change in thickness may be discrete (as in the 'step-pyramid' configuration) or continuous. Those skilled in the art will appreciate that there are other possible solutions for achieving a variable thickness in a magnetically permeable layer, and the invention is not limited in this respect.

In another embodiment of the invention, the thickness of the magnetically permeable layer may vary in some other manner and not necessarily increase towards the centre of the magnetically permeable layer. For example, in some applications it may be beneficial to have a thicker magnetically permeable layer towards the edges of the particular transmitter.

In a preferred embodiment of the invention, the magnetically permeable layer is a ferrite material. However, those skilled in the art will appreciate that other suitable materials could be used to the same or similar effect.

Though the invention has been described in regards to the base portion of a charging enclosure, the invention is not limited to this application. Those skilled in the art will appreciate that in any instance where it is beneficial to include a magnetically permeable layer in a transmitter, it might be possible, and indeed worthwhile, for the thickness of that layer to vary in accordance with the present invention. By way of example, a charging surface that includes a large coil that is coplanar to the surface could benefit from including a magnetically permeable layer that increases in thickness towards the centre of the surface. This would help resolve problems associated with weaker magnetic fields (and less efficient power transfer) towards the centre of such a charging surface.

Magnetically Permeable Layer—Variable Permeability

Figure 12:
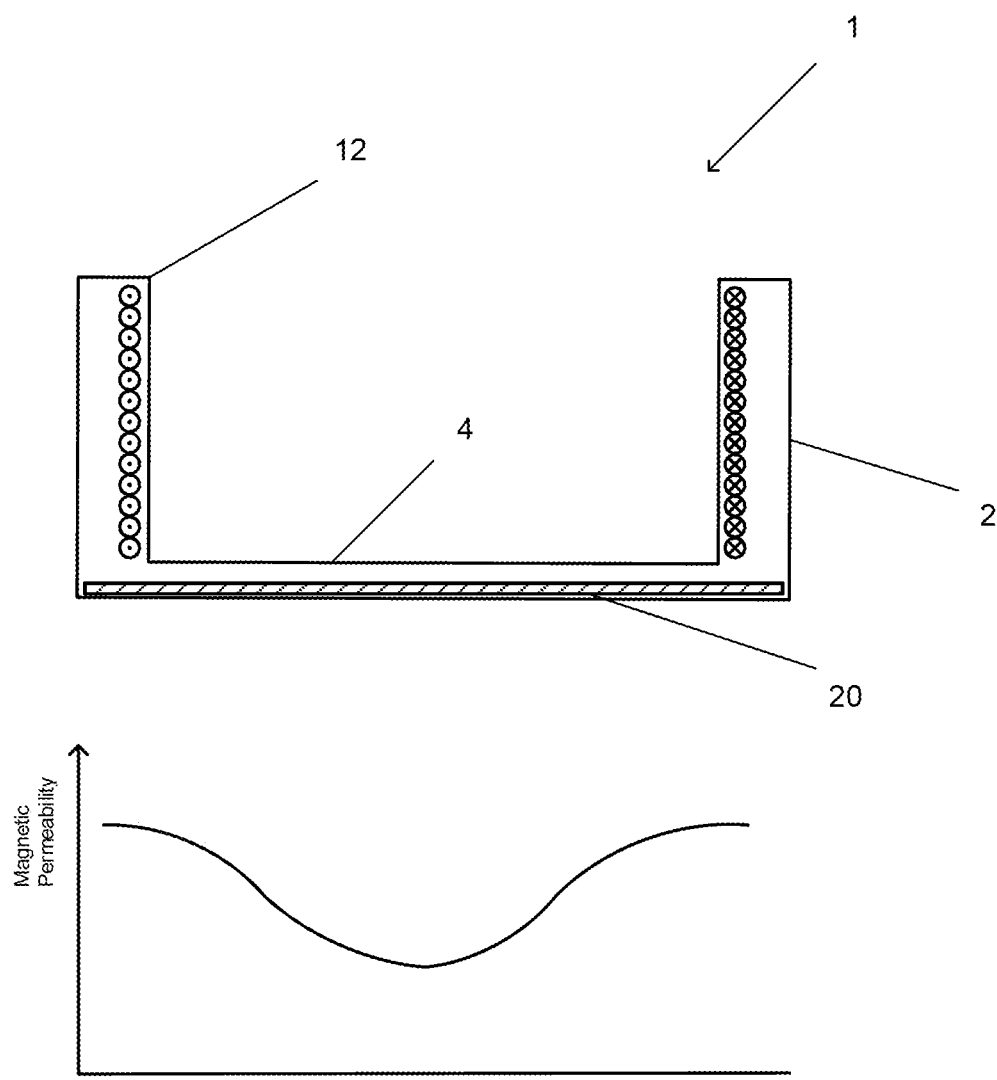
FIG. 12 shows a cross-sectional view of a transmitter according to another aspect of the present invention.

Referring to FIG. 12, there is shown a cross-section of a transmitter 1 according to another aspect of the present invention. In this instance, the transmitter is a charging enclosure 2 similar to that charging enclosure described previously. The enclosure includes sidewalls 3 and a coil 5 that is wound around the perimeter of the enclosure, all housed within a suitable outer layer 12. Included in the base portion 4 is a magnetically permeable layer 20. As described earlier, including a magnetically permeable layer can improve power transfer by essentially 'reshaping' the magnetic field.

Figure 13A:
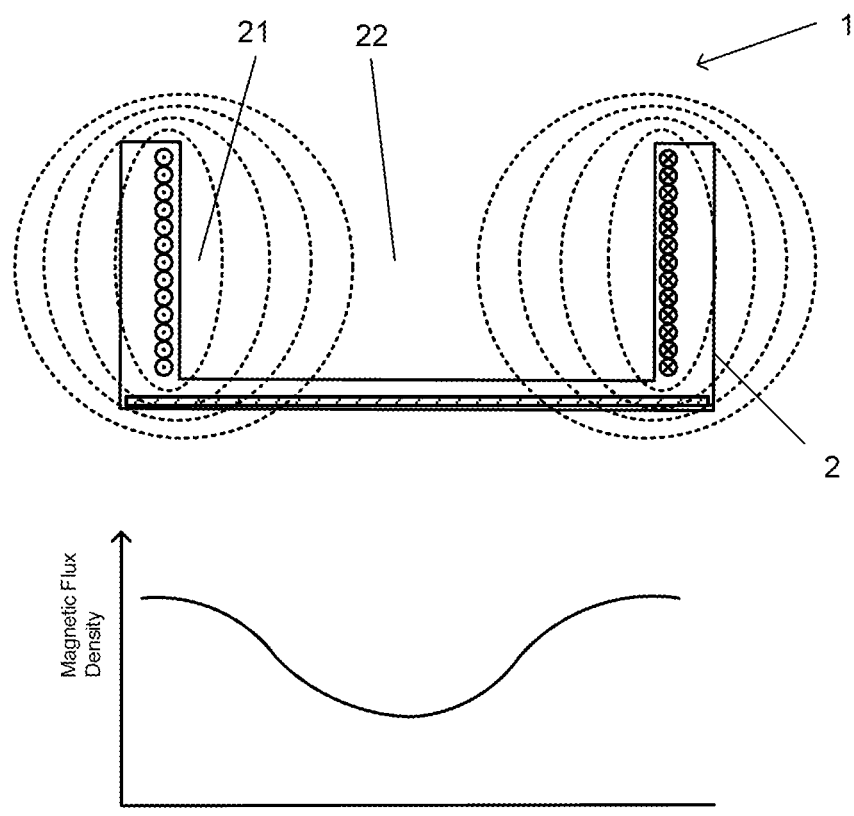
FIG. 13 shows a schematic comparing the magnetic field lines generated by two different transmitters.
Figure 13B:
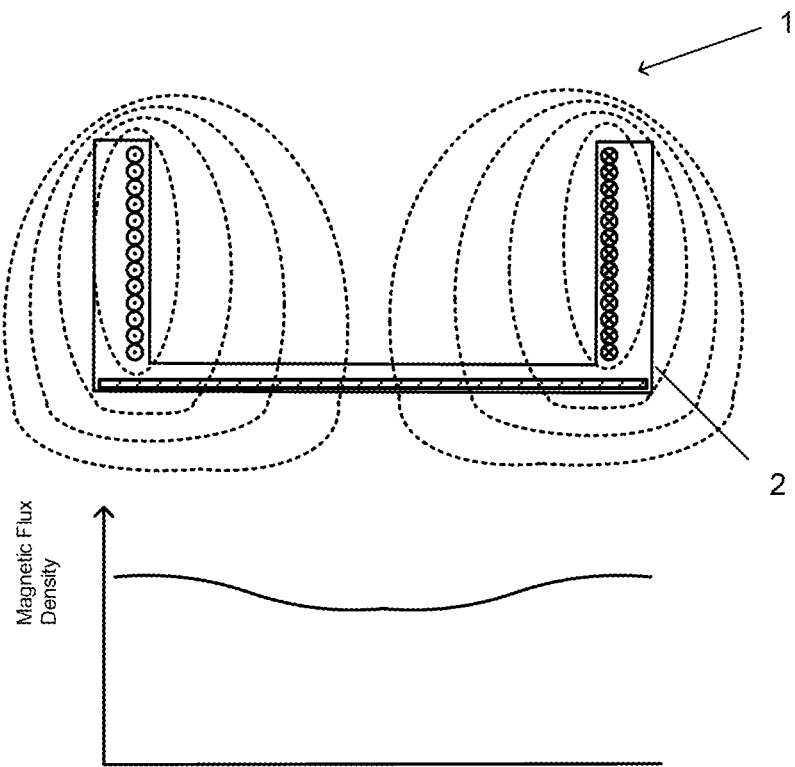

As shown by the corresponding graph in FIG. 12, the permeability of the magnetically permeable layer 20 varies across the width of the charging enclosure 2, with the permeability being a maximum generally towards the centre of the charging enclosure. In the embodiment of the invention shown in FIG. 12, this helps improve power transfer by further compelling the magnetic field towards the centre of the charging enclosure, resulting in a more uniform magnetic field. This is demonstrated by a comparison of the magnetic field lines as shown in FIGS. 13a and 13b. It will be observed that for the former scenario in FIG. 13a, the magnetic flux is concentrated towards the walls of the enclosure 21, with there being a region of lower magnetic flux towards the centre 22. This raises the same problems as that described in relation to FIG. 4a earlier. FIG. 13b demonstrates the magnetic field according to the magnetically permeable layer arrangement of the present invention. As will be observed, the increased permeability of the magnetically permeable layer towards the centre of the enclosure results in a more uniform magnetic field. The mechanism by which this occurs is that the increased permeability of the magnetically permeable layer towards the centre, results in a magnetic path with a section of decreased reluctance, hence the magnetic field will be compelled towards this region. The more uniform magnetic field helps resolves the issues arising from the non-uniform field, as described in relation to FIG. 4a earlier.

Referring again to FIG. 12, it is seen that the magnetically permeable layer 20 is of constant thickness, but the permeability varies in a continuous manner. In one embodiment of the invention, the magnetically permeable layer could be originally manufactured with such a continuous variation in its magnetic permeability properties. In another embodiment, the magnetically permeable layer could be originally manufactured with discrete variations in its magnetic permeability properties.

Figure 14:
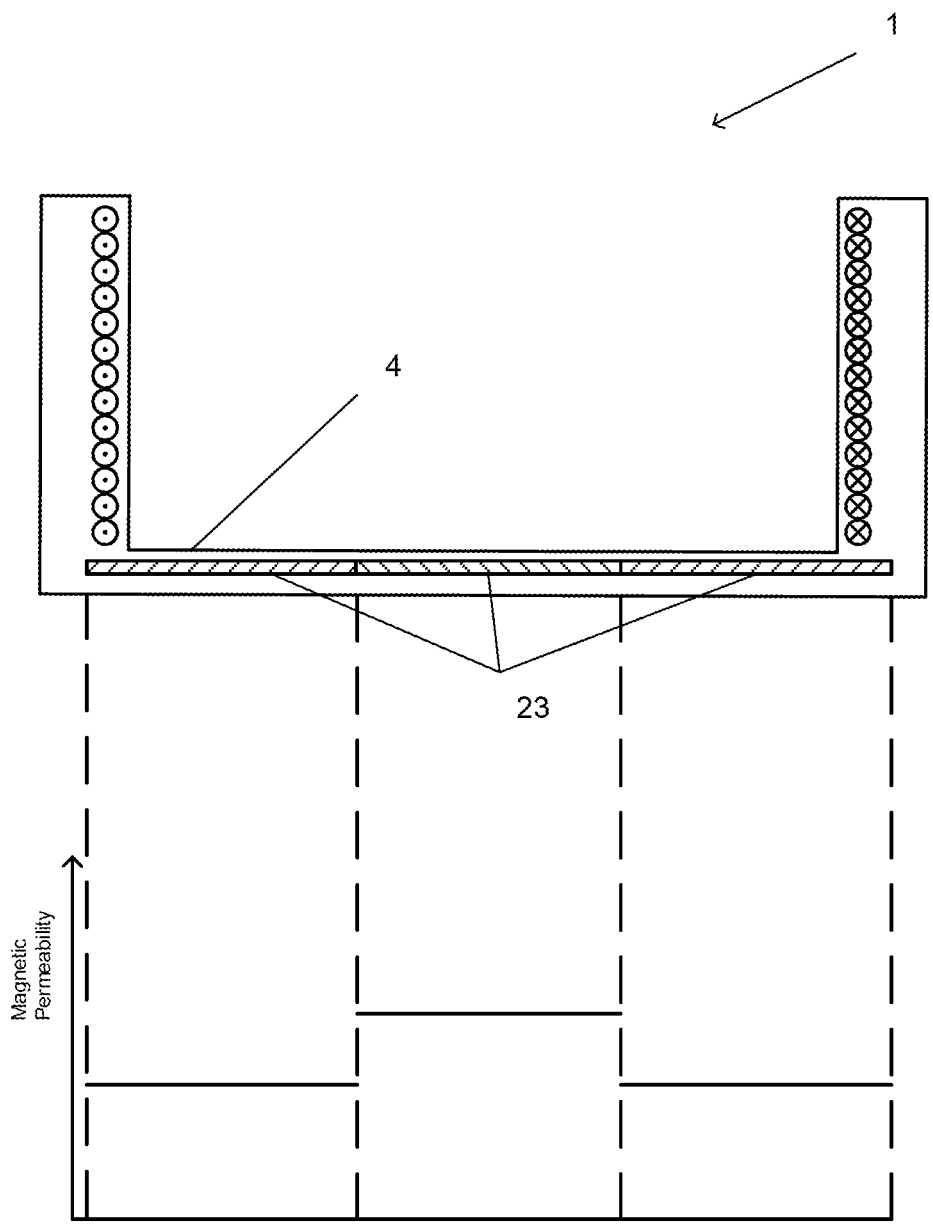
FIG. 14 shows a cross-sectional view of a transmitter according to another embodiment of the aspect of the present invention shown in FIG. 12.

Referring to FIG. 14, there is shown another embodiment of a transmitter 1 according to the present invention, including several sections of magnetically permeable layer 23 arranged next to each other within the base portion 4. In this instance, the magnetic permeability of each section could have a different magnitude, resulting in the variation in magnetic permeability shown in the accompanying graph. In the case of an enclosure according to one embodiment of the present invention, such sections could be made from concentric rings of magnetically permeable material.

In another embodiment of the invention, the permeability of the magnetically permeable layer may vary in some other manner and not necessarily increase towards the centre of the magnetically permeable layer. For example, in some applications it may be beneficial to have a magnetically permeable layer with higher permeability towards the edges of the particular transmitter.

In a preferred embodiment of the invention, the magnetically permeable layer is a ferrite material. However, those skilled in the art will appreciate that other suitable materials could be used to the same or similar effect.

Though the invention has been described in regards to the base portion of a charging enclosure, the invention is not limited to this application. Those skilled in the art will appreciate that in any instance where it is beneficial to include a magnetically permeable layer in a transmitter, it might be possible, and indeed worthwhile, for the permeability of that layer to vary in accordance with the present invention. By way of example, a charging surface that includes a large coil that is coplanar to the surface could benefit from including a magnetically permeable layer that increases in permeability towards the centre of the surface. This would help resolve problems associated with weaker magnetic fields (and less efficient power transfer) towards the centre of such charging surfaces.

Combination

There have been described several aspects of the transmitter according to the present invention, namely: a variable coil density; a variable thickness of the magnetically permeable layer; and a variable permeability of the magnetically permeable layer. Those skilled in the art will appreciate that any of these aspects can be combined in any number of ways. For example, for certain charging enclosures it may be worthwhile to have increased coil density towards the top of the enclosure and a base portion that includes a magnetically permeable layer that increases in magnetic permeability towards the centre of the base portion. In another example, a charging surface may include a magnetically permeable layer wherein the thickness and the magnetic permeability of the layer progressively increase towards the centre of the charging surface. In any embodiment of the present invention which include the magnetically permeable material, the material 'layer' or 'shield' may have a thickness of less than about 1.0 mm, e.g., about 0.5 mm. Further, the magnetic permeability may be that of the ferrite DS037803 produced by Kitagawa Industries.

Figure 15:
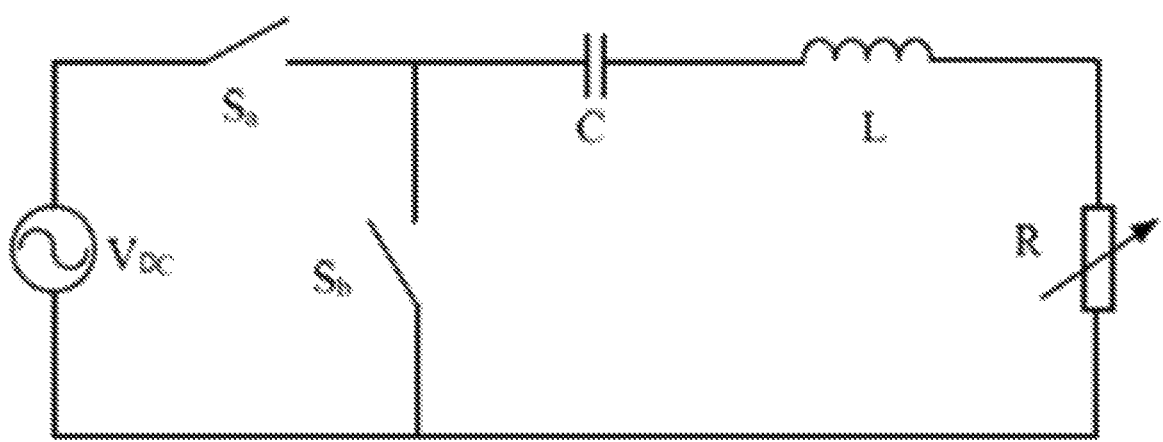
FIG. 15 shows a schematic view of drive circuitry for driving the transmitter embodiments of the present invention.

The drive circuitry used to drive the production of the time-varying magnetic field by the transmitter coil(s) may have a current injection topology as illustrated in FIG. 15. In this topology, a DC power supply is converted into a sinusoidal voltage across the transmitter coil(s) using an inverter configuration. The inverter has two operating modes: energy injection and free oscillation. When switch Sa is 'closed' and switch Sb is 'open', the resonant tank, provided by inductor L (e.g., the transmitter coil) and series capacitor C, is directly connected to the power supply. During this period energy is injected into the resonant tank. However, when the switch Sa is 'open' and switch Sb is 'closed', the inductor L, its tuning capacitor C and resistor R form a free oscillation network. The stored energy in the closed path of the resonant tank will oscillate in the form of an electric field in the capacitor and magnetic field in the inductor. The control of the switches is provided by suitable control circuitry, such as a microcontroller. In applications of the present invention in which the transmitter is provided in a vehicle interior, the DC supply may be a 12V power supply. Other applications may require an AC power supply however, which those skilled in the art understand how to implement.

There are thus provided a transmitter arrangement for an IPT system that results in generating a magnetic field that is more uniform. Since the field is more uniform, the quality of the coupling between the transmitter and the receiver is improved, and less power is needed to power or charge the device, resulting in a more efficient IPT system. Further, since the required current to power the devices decreases, there are fewer losses due to parasitic heating in the devices placed near or on the transmitter.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transfer transmitter including:
   an enclosure for accommodating devices to be energized having a base portion and one or more side walls projecting from the base portion;
   one or more coils wound around the side walls for generating an alternating magnetic field within the enclosure, the number of loops per unit height of the one or more coils initially decreasing with increased distance from the base portion and then increasing with further increased distance from the base portion; and
   drive circuit for driving the one or more coils;
   wherein the one or more coils have a predetermined lower spacing adjacent to the base portion, a predetermined higher spacing in a middle distance from the base portion, and the predetermined lower spacing distal to the base portion.

2. An inductive power transfer transmitter as claimed in claim 1, wherein the one or more coils are generally wound to correspond to the perimeter of the enclosure.

3. An inductive power transfer transmitter as claimed in claim 1, wherein the enclosure has a plurality of side walls, one of the side walls being generally higher than the other side walls.

4. An inductive power transfer transmitter as claimed in claim 2, wherein the enclosure includes one or more magnetically permeable elements associated with the one or more coils.

5. An inductive power transfer transmitter as claimed in claim 4, wherein the combined thickness of the one or more magnetically permeable elements varies.

6. An inductive power transfer transmitter as claimed in claim 4, wherein the permeability of the one or more magnetically permeable elements varies.

7. An inductive power transfer transmitter as claimed in claim 4, wherein the one or more magnetically permeable elements is provided in the base and/or the one or more side walls.

8. An inductive power transfer transmitter as claimed in claim 2, wherein the changes in number of loops per unit height of the one or more coils are provided by configuring the one or more coils from wire having varying gauge.

9. An inductive power transfer transmitter as claimed in claim 2, wherein the changes in number of loops per unit height of the one or more coils are provided by configuring the one or more coils from wire having varying spacing.

10. An inductive power transfer transmitter as claimed in claim 1, wherein the predetermined lower spacing is substantially adjacent, and the predetermined higher spacing is between 0.5-7 mm.

11. An inductive power transfer transmitter as claimed in claim 1, wherein the one or more coils are made of Litz wire.

12. An inductive power transfer transmitter as claimed in claim 1, further comprising a removable lid.

* * * * *

UNITED STATES PATENT AND TRADEMARK OFFICE
CERTIFICATE OF CORRECTION

PATENT NO. : 10,818,430 B2
APPLICATION NO. : 15/514251
DATED : October 27, 2020
INVENTOR(S) : Lawrence Bernardo Dela Cruz It is certified that error appears in the above-identified patent and that said Letters Patent is hereby corrected as shown below:

In the Claims

Claim 1, at Column 13, Line 12, insert -- a -- before -- drive --

Signed and Sealed this
Twenty-second Day of December, 2020

Andrei Iancu
*Director of the United States Patent and Trademark Office*